(12) United States Patent
Nonomura

(10) Patent No.: US 6,358,293 B1
(45) Date of Patent: Mar. 19, 2002

(54) METHODS FOR RENDERING HIGH CONCENTRATIONS OF MANGANESE SAFE FOR PLANT GROWTH AND FORMULATIONS FOR SAME

(75) Inventor: Arthur M. Nonomura, Boxborough, MA (US)

(73) Assignee: The Hampshire Chemical Corporation, Nashua, NH (US)

( * ) Notice: Subject to any disclaimer, the term of this patent is extended or adjusted under 35 U.S.C. 154(b) by 0 days.

(21) Appl. No.: 09/448,345

(22) Filed: Nov. 23, 1999

(51) Int. Cl.[7] ................................................. C05F 11/00
(52) U.S. Cl. ........................ 71/27; 71/27; 71/31; 71/61; 71/11; 504/119
(58) Field of Search ................................ 71/11, 27, 31, 71/61; 504/119

(56) References Cited

U.S. PATENT DOCUMENTS

| | | | |
|---|---|---|---|
| 3,869,272 A | * 3/1975 | Windgasen | 71/1 |
| 4,265,653 A | * 5/1981 | Hoyt, IV et al. | 71/11 |
| H224 H | 3/1987 | Malik et al. | 71/92 |
| H303 H | 7/1987 | Malik et al. | 514/85 |
| 5,177,307 A | 1/1993 | Houck et al. | 800/205 |
| 5,372,626 A | * 12/1994 | Zivion et al. | 71/11 |
| 5,549,729 A | 8/1996 | Yamashita | 71/26 |
| 5,578,552 A | 11/1996 | Katayama et al. | 504/285 |
| 5,919,998 A | 7/1999 | Bandurski et al. | 800/286 |
| 5,928,993 A | * 7/1999 | Johansson | 504/116 |
| 5,958,104 A | 9/1999 | Nonomura et al. | 71/11 |

OTHER PUBLICATIONS

Physiologia Plantarium 75: 511–517. Copenhagen 1989, "Cytokinin concentration in relation to mineral nutrition and benzyladenine treatment in Plantago major ssp. pleiosperma": Kuiper, et al.

Proc. Natl. Acad. Sci. vol. 96, pp. 284–289, Jan. 1999 Plant Biology; "Isolation of a cytokinin gene, ZOG1, encoding zeatin O–glucosyltransferase from *Phaseolus lunatus*"; Martin, et al.

The Plant Journal (1996), 33–46; "Chemically induced expression of the roIC–encoded β–glucosidase in transgenic tobacco plants and analysis of cytokinin metabolism: roIC does not hydrolyze endogenous cytokinin glucosides in planta"; Faiss, et al.

J. Agric. Food Chem., vol. 45, No. 7, 1997 pp. 2763–2767; "Effects of Foliar Applications of Carbohydrates on the Yield of Cotton (*Gossypium hirsutum*) Lint": Hedin, et al.

J. Jasik et al. Plant Science 124 (1997) 57–68; "Characertisation of morphology and root formation in the model woody perennial shrub....";.

* cited by examiner

Primary Examiner—Chhaya D. Sayala

(57) ABSTRACT

Methods for rendering high concentrations of manganese safe for plant growth, comprising the steps of, mixing one or more alkyl glycosides with Mn resulting in a mixture comprising Mn at a concentration of between about 20 to 75 ppm, and applying a suitable volume of the resulting mixture to one or more plants; and formulations for same.

32 Claims, No Drawings

METHODS FOR RENDERING HIGH CONCENTRATIONS OF MANGANESE SAFE FOR PLANT GROWTH AND FORMULATIONS FOR SAME

FIELD OF THE INVENTION

This invention relates to methods and formulations for treating plants, and more specifically to methods for treating plants with formulations comprising a high concentration of manganese.

BACKGROUND OF THE INVENTION

There are many known compositions for treating plants and for enhancing plant growth and crop yield. These compositions include various plant growth regulators such as cytokinins, auxins, brassinolides and gibberellins which may be applied to plants with or without additional macro- and micronutrients. It is also known to apply water soluble carbohydrates such as sucrose, fructose and glucose with additional macro- and micronutrients as described in U.S. Pat. No. 5,549,729 or to apply various alkyl glucosides with additional macro- and micronutrients as described in U.S. Pat. No. 5,958,104.

With respect to secondary nutrients, additive compositions may comprise one or more of the commonly used macronutrients such as sulfur, calcium and magnesium and/or micronutrients such as chelated iron, boron, cobalt, copper, manganese, molybdenum, zinc and nickel. Of the micronutrients typically used, several are of particular importance, namely, zinc, iron and manganese. However, it is known that high doses of these micronutrients are lethal to plants because the plants are not able to metabolize the micronutrients at a sufficient rate. Specifically, it is known that, under conventional conditions of plant culture, manganese is phytotoxic to plants at concentrations greater than 500 parts per billion (ppb), especially under acidic conditions. Moreover, iron deficiency may be induced in the presence of high concentrations of manganese. Thus the use of micronutrients to treat plants and facilitate plant growth has until now been limited to very small amounts.

SUMMARY OF THE INVENTION

The invention is the result of the discovery that high concentrations of manganese, when formulated with alkyl glucosides as primers for starch synthesis and cellulose synthesis, are capable of facilitating a plant's metabolism of manganese and thus enhancing plant growth. The invention provides methods for formulating Mn at preferably about 2 to 15 parts per million (ppm) concentrations for root exposure and at preferably about 15 to 75 ppm for foliar applications and applying the high concentrations to plants in a manner which is nontoxic and designed to enhance plant growth.

It is therefore a primary object of this invention to provide a method for formulating a nontoxic composition comprising a high concentration of manganese and one or more alkyl glycosides and applying the formulation to plants in a manner which enhances plant growth without compromising the plant.

It is a further object of this invention to provide a nontoxic plant treatment and growth formulation comprising a high concentration of manganese and one or more alkyl glycosides.

The preferred methods of the invention for rendering high concentrations of manganese safe for plant growth, generally comprise the steps of: mixing one or more alkyl glycosides with manganese, preferably in a mixture comprising manganese at a concentration between about 2 to 100 ppm, and applying a suitable volume of the resulting mixture to one or more plants. The concentration of manganese is preferably between about 2 to 100 ppm generally, and specifically, 2 to 15 ppm for root application and 15 to 75 ppm for shoot application. The preferred alkyl glycoside comprises one or more methyl glucosides and the manganese is preferably water soluble, for example, by sequestering or otherwise solubilizing the manganese with a complexing agent selected from a group consisting of HeEDTA, DTPA, EDTA, EDDHA, citrate, ascorbate and other such Mn chelants.

The alkyl glycoside and manganese mixture may be applied as a dry or liquid formation directly to the plant soil and/or a foliar formulation applied to the foliage of the plants. In formulations wherein the manganese is at a concentration equal to or greater than 20 ppm and is to be applied to plant foliage, the formulation preferably further comprises iron at a concentration approximately equal to the concentration of manganese. In formulations wherein the manganese is at a concentration greater than 10 ppm and is to be applied to the plant roots, the formulation, likewise, preferably comprises iron at a concentration approximately equal to the concentration of manganese.

The alkyl glycoside may comprise a blend of α-methyl glucoside and β-methyl glucoside, wherein the blend of α-methyl glucoside and β-methyl glucoside may be a liquid syrup mixed with manganese solubilized by EDTA. The method may also comprise the step of adding one or more aqueous surfactants to the mixture.

Another preferred method for rendering high concentrations of manganese safe for plant growth, comprises the steps of: mixing one or more alkyl glycosides with at least manganese, iron and an ammonia nutrient, resulting in a mixture comprising manganese at a concentration of between about 2 to 100 ppm; and applying a suitable amount of the resulting mixture to one or more plants. The iron is preferably at a concentration approximately equal to the concentration of manganese; the ammonia nutrient is preferably ammoniacal nitrogen; and the manganese is chelated $Mn^{+2}$ solubilized with a complexing agent.

The dry formulation preferably comprises 500 g of methyl glucoside, wherein the manganese is mixed with the methyl glucoside as 2 g of 12% Mn solubilized by EDTA. The resulting mixture may be applied dry to the soil and then watered or may be diluted first in an aqueous carrier and then applied to the soil. To dilute the dry mixture, about 400 grams of the resulting mixture is diluted in about 80 liters of water or any other suitable aqueous carrier and applied to the plants in an amount that will deliver a minimum of about 20 mg of dry powder per plant. The liquid formulation preferably comprises about 1.94 g methyl glucoside added to about 1 liter of an aqueous solution comprising about 1 ppm chelated Mn and applied in a sufficient volume to drench the plant roots. The Mn is preferably mixed with the alkyl glycoside as $Mn^{+2}$ solubilized with a complexing agent selected from a group consisting of HeEDTA, DTPA, EDTA, EDDHA, citrate, ascorbate and any other Mn chelant. Alternatively, the liquid formulation may comprise 65% methyl glucoside liquid syrup mixed with 6% Mn solubilized with EDTA, wherein about 1.5 kg of the 65% methyl glucoside liquid syrup is mixed with about 8 g of $Mn^{+2}$ solubilized with EDTA and then diluted in about 200 liters of water.

The preferred foliar formulation comprises about 500 g of α-methyl glucoside mixed with about 2 g of MnEDTA (12%

Mn) and diluted in about 2.25 liters of an aqueous carrier. The method for making and applying the foliar formulation may further comprise the step of adding one or more aqueous surfactants, such as about 2 g Pluronic L-92 (BASF) to the formulation and applying the resulting mixture by spraying to glisten on the plant foliage in an amount between about 1 to 4 ml per plant.

The preferred formulation of the invention for treating plants and enhancing plant growth, generally comprises: one or more alkyl glycosides; and manganese at a concentration of between about 2 to 100 ppm. More specifically, for foliar applications, the manganese is preferably at a concentration between about 15 to 50 ppm and further comprises iron at a concentration approximately equal to said concentration of said manganese; and for root applications, the manganese is at a concentration between about 2 to 10 ppm.

The formulation may more specifically and preferably comprise one or more of the following: a manganese source comprising $Mn^{+2}$; one or more alkyl glycosides comprising one or more methyl glucosides, wherein the methyl glucoside preferably comprises a 50/50 blend of $\alpha$-methyl glucoside and $\beta$-methyl glucoside; one or more complexing agents selected from a group consisting of HeEDTA, DTPA, EDTA, EDDHA, citrate, ascorbate and any other manganese chelant; one or more aqueous carriers; one or more iron sources; one or more surfactants; and one or more ammonia sources. The iron is preferably at a concentration approximately equal to the total concentration of the manganese.

The methods and formulations of the invention may be advantageously used with any type of plant or plant-like organisms which synthesize cellulose, including, but not limited to, plants with stems, roots and leaves and plant-like organisms such as yeasts, fungi, molds and algae.

DETAILED DESCRIPTION OF THE PREFERRED METHODS AND FORMULATIONS

The methods and formulations of the invention are designed to treat plants and to enhance plant growth. Treatment and plant growth enhancement are generally achieved by formulating manganese with an alkyl glycoside and applying the mixture in a dry or liquid form directly to the plants and/or the plant soil. Specifically, the formulations enable plants to metabolize high concentrations of manganese between about 2–100 ppm generally and specifically between about 2–15 for root application and between about 15–75 for foliar application, which would otherwise be phytotoxic to the plants but for the formulations.

Unless otherwise defined, all technical and scientific terms employed herein have their conventional meaning in the art. As used herein, the following terms have the meanings ascribed to them.

"Enhance(s) growth" or "enhancing growth" refers to promoting, increasing or improving the rate of growth of the plant or increasing or promoting an increase in the size of the plant.

"Plants" refers to any life form which synthesizes cellulose including higher plants characterized by roots, stems and foliage and lower plants and plant-like organisms such as yeasts, fungi, molds and algae.

"Surfactant" refers to surface-active agents, which modify the nature of surfaces, often by reducing the surface tension of water. They act as wetting agents, dispersants, or penetrants. Typical classes include cationic, anionic (e.g. alkylsulfates), nonionic (e.g. polyethylene oxides) and ampholytic surfactants. Soaps, alcohols and fatty acids are other examples.

"Percent" or "%" is percent by weight unless otherwise indicated.

"Ppm" refers to parts per million by weight.

"Alkyl glycoside" refers to any glycoside bonded to a straight chain, saturated or unsaturated, hydrocarbon.

"Aqueous" with reference to solutions and solvents refers to solutions or solvents which consist primarily of water, normally greater than 90 weight percent water and can be essentially pure water in certain circumstances. For example, an aqueous solution or solvent can be distilled water, tap water or the like. However, an aqueous solution or solvent can include water having substances such as pH buffers, pH adjusters, organic and inorganic salts, alcohols (e.g. ethanol), sugars, amino acids or surfactants incorporated therein. The aqueous solution or solvent may also be a mixture of water and minor amounts of one or more cosolvents which are miscible therewith. Agronomically suitable organic solvents include, for example, paraffin oil, acetone, emulsifiers and polysiloxanes.

"Complexing agent" refers to a chelating agent used to solubilize minerals which might otherwise precipitate and therefore become less assimilable. Complexing agents are particularly useful in a foliar formulation. Useful complexing agents include, but are not limited to: ethylenediaminetetraacetic acid, (EDTA); ethylenediamine-di(o-hydroxyphenylacetic acid), (EDDHA); N-(2-Hydroxyethyl) ethylenediaminetriacetic acid, (HeEDTA or otherwise known as HEDTA); diethylenetriaminepentaacetic acid (DTPA), citrate and ascorbate.

The resulting mixture of the method of the invention may be applied to all parts of the plant including the leaves, shoots, roots, stems, flowers and fruits depending on whether a dry, liquid or foliar formulation is utilized.

The compositions and methods of the present invention may be applied to virtually any variety of plants, fruits or organism which synthesizes cellulose. In particular, the compositions and methods of the present invention may be preferably applied to "higher plants" and "lower plants". Higher plants include, but are not limited to, all species having true stems, roots, and leaves. Plants which may benefit according to the present invention include but are not limited to all crop plants, such as, alfalfa, anise, bach ciao, barley, basil, blueberry, breadfruit, broccoli, brussels sprouts, cabbage, cassava, cauliflower, celery, cereals, cilantro, coffee, corn, cotton, cranberry, cucumber, dill, eggplant, fennel, grape, grain, garlic, kale, leek, legume, lettuce, melon, mint, mustard, oat, onion, parsley, peanut, pepper, potato, saffron, millet, parsnip, pea, peppermint, pumpkin, radish, rice, sesame, sorghum, soy, spinach, squash, stevia, strawberry, sunflower, sweet potato, sugar beet, sugar cane, tea, tobacco, tomato, turnip, wheat, yam, zucchini and the like; pomes and other fruit-bearing plants, such as, almond, apple, avocado, banana, breadfruit, cherry, citrus, cocoa, fig, guava, macadamia, mango, mangosteen, nut, olive, papaya, passion fruit, pear, pepper, plum, peach and the like; floral plants, such as achillea, ageratum, alyssum, anemone, aquilegia, aster, azalea, begonia, bird-of-paradise, bleeding heart, borage, bromeliad, bougainvillea, buddlea, cactus, calendula, camellia, campanula, carex, carnation, celosia, chrysanthemum, clematis, cleome, coleus, cosmos, crocus, croton, cyclamen, dahlia, daffodil, daisy, day lily, delphinium, dianthus, digitalis, dusty miller, euonymus, forget-me-not, fremontia, fuchsia, gardenia, gazania, geranium, gerbera, gesneriad, ginkgo, gladiolus, hibiscus, hydrangea, impatiens, jasmine, lily, lilac, lisianthus, lobelia, marigold, mesembryanthemum, mimulus, myosotis, New Guinea Impatiens, nymphaea, oenothera, oleander, orchid, oxalis, pansy, penstemon, peony, petunia, poinsettia, polemonium, polygonum, poppy, portulaca, primula, ranunculus, rhododendron, rose, salvia, senecio, shooting star, snapdragon, solanum, solidago, stock, ti, torenia, tulip, verbena, vinca, viola, violet, zinnia, and the like; leafy plants, such as ficus, hosta, philodendron, and the like; trees, such as Abies, birch, cedar, Cornus, cypress, elm, ficus, fir, juniper, magnolia, mahogany, maple, oak, palm, Picea, Pinus, Pittosporum, Plantago, poplar, redwood, Salix, sycamore, Taxus, teak, willow, yew, Christmas tree and the like; grasses, such as Kentucky blue grass, bent grass, turf, festuca, pennisetum, phalaris, calamogrostis, elymus, helictotrichon, imperata, molina, carex, miscanthus, panicum, and the like.

The formulations and methods of the present invention may also be applied to "lower plants". Lower plants include, but are not necessarily limited to, yeasts; fungi; mushrooms; algae, such as kelp, Eucheuma, laver, nori, kombu, wakame; mosses; liverworts; and ferns. This list is intended to be exemplary and is not intended to be exclusive. Other plants and plant-like organisms which may benefit by application of the compositions and methods of the present invention will be readily determined by those skilled in the art.

The methods and formulations of the present invention may be used to enhance growth in juvenile and mature plants, as well as cuttings and seeds. Generally, the plant location to which the composition of the method is applied should have a surface area large enough to enable the plant to absorb the composition. For example, it is desirable that the plants include the sprouted cotyledon (i.e., the "seed leaves") or other substantial surfaces which will facilitate absorption, such as the true leaves. Fruit bearing plants may be treated before and after the onset of bud, fruit and seed formation.

The methods of the present invention, for treating plants and enhancing plant growth, are achieved by applying to the plant high concentrations of $Mn^{+2}$ with an alkyl glycoside, or a hydrate thereof or ester derivative thereof or salt thereof. Suitable alkyl glycosides for use in the methods and compositions of the present invention include the straight chain alkyl glycosides as well as any of a wide variety of glycoside derivatives including but not limited to ethoxylate derivatives, propoxylate derivatives, hydrates, aldehyde derivatives, ester derivatives, ether derivatives, alcohol derivatives, phenol derivatives, urea derivatives, amine derivatives and acetyl derivatives, other biologically or chemically equivalent substances, and any combination of two or more of the foregoing. We have found that the lower chain, $C_1$ to $C_3$ alkyl glycosides are advantageously absorbed and metabolized by the plant through the existing membrane transport systems. Suitable alkyl glycosides include, but are not limited to, methyl glycoside compounds such as α-methyl glucoside, β-methyl glucoside, and combinations thereof; ethyl glucoside; propyl glucoside; methyl galactoside; methyl mannoside; diglycosides such as methyl galactopyranosylglucoside; methyl fucoside; methyl alloside; methyl altroside; methyl guloside; methyl idoside; methyl taloside; and methyl ketosides; urea; and ether derivatives of alkyl glycosides. Any of the foregoing alkyl glycosides may be combined for use in the methods and compositions of the present invention. Currently, the preferred alkyl glycosides for use in the methods and compositions of the present invention include α-methyl glucoside, β-methyl glucoside and combinations of α- and β-methyl glucoside. An approximately 50/50 blend of α-methyl glucoside and β-methyl glucoside is currently the most preferred alkyl glycoside for use in the methods and compositions of the present invention.

The manganese and alkyl glycoside compounds employed in at least the foliar methods and compositions of the present invention preferably also comprise soluble iron, a surfactant and ammoniacal nitrogen. The combination with ammoniacal nitrogen is especially important for shoot growth and for growth of thalli. The relative ratio of the glycoside to the ammoniacal nitrogen source depends on the route of administration. The manganese and alkyl glycoside compounds employed in at least the methods for root exposure preferably comprise iron and major N-P-K nutrients.

Although the alkyl glycoside compound may be applied to the plant in a solid form, it is often advantageous to provide the alkyl glycoside in liquid form, such as by dispersing, solubilizing, or otherwise admixing the alkyl glycoside in an aqueous or agronomically suitable organic solvent or carrier to produce aqueous or organic solutions, dispersions or emulsions containing the alkyl glycoside for application to the plant. The amount of alkyl glycoside which is solubilized in the carrier will depend upon the particular alkyl glycoside selected and the method of application. The alkyl glycoside compound may be solubilized in the carrier by adding the compound to the carrier and allowing the compound to dissolve. In some instances, the application of stirring, agitation, or even heat may facilitate the dissolution of the alkyl glycoside in the carrier.

The formulations employed in the methods of the present invention may be applied to the plants using conventional application techniques. Plants nearing or at maturity may be treated at any time before and during seed development. Fruit bearing plants may be treated before or after the onset of bud or fruit formation. Improved growth occurs as a result of the exogenous application of high concentrations of chelated manganese with alkyl glycoside and other appropriate nutrients and additives.

The formulations employed in the methods of the invention may also include any of a wide variety of agronomically suitable additives, adjuvants, or other ingredients and components which improve or at least do not hinder the beneficial effects of the manganese and alkyl glycoside (hereinafter "additives") to provide the compositions of the present invention. Generally accepted additives for agricultural application are periodically listed by the United States Environmental Protection Agency. For example, foliar compositions may contain a surfactant and a spreader present in an amount sufficient to promote wetting, emulsification, even distribution and penetration of the active substances. Spreaders are typically organic alkanes, alkenes or polydimethylsiloxanes which provide a sheeting action of the treatment across the phylloplane. Suitable spreaders include paraffin oils and polyalkyleneoxide polydimethylsiloxanes. Suitable surfactants include anionic, cationic, nonionic, and zwitterionic detergents, amine ethoxylates, alkyl phenol ethoxylates, phosphate esters, PEG, polymerics, polyoxyethylene fatty acid esters, polyoxyethylene fatty diglycerides, sorbitan fatty acid esters, alcohol ethoxylates, sorbitan fatty acid ester ethoxylates, ethoxylated alkylamines, quaternary amines, sorbitan ethoxylate esters, alkyl polysaccharides, block copolymers, random copolymers, trisiloxanes, chelactants and blends. Surfactant preference is for polyalkylene oxides, polyalkylene glycols, and alkoxylate-fatty acids. Preferred commercial aqueous surfactants include Hampshire LED3A; HAMPOSYL®; TEEPOL®; TWEEN®; TRITON®; LATRON™; PLU- RONIC®; TETRONIC®; SURFONIC®; SYNPERONIC®; ADMOX®; DAWN®, and the like. Commercial emulsifiers for combination with organic solvent formulations include WITCANOL®, RHODASURF®, TERGITOL® and TWEEN®. Commercial spreaders include TEGOPREN®, AGRIMAX™, DOW CORNING® 211, X-77®, SILWET® and the like. Penetrants such as sodium dodecylsulfate, formamides and lower aliphatic alcohols, may be used. Alkoxylation of an active component or otherwise chemically modifying the active components by incorporating a penetrant substance is useful because formulation without additional surfactant is achieved.

In addition to the foregoing additives, the formulations of the present invention may also advantageously include one or more conventional fertilizers. Suitable fertilizers for inclusion in the formulations, methods and systems of the present invention will be readily determinable by those skilled in the art and include conventional fertilizers containing elements such as nitrogen, phosphorus, potassium, sulfur, calcium, elevated carbon dioxide, micronutrients and the like. Phosphorous, potassium, and nitrogenous fertilizers (i.e., fertilizers containing nitrogen) are currently preferred, particularly ammonia fertilizers and salts thereof. In particular, in cases requiring foliar fertilizers, ammoniacal nitrogen fertilizers are most preferred. In order to support rapid vegetative growth above normally fertilized crops, the most highly preferred fertilizer for inclusion in methyl glucoside formulations are nitrogenous fertilizers, especially ammonium salts, urea and nitrates, preferably ammonium sulfate, ammonium phosphate or ammonium nitrate, within the supplemental range of 0.2% to 2%. For example, 1% to 3% methyl glucosides may be formulated with the nitrogen source, 0.2% to 0.6% ammonium nitrate. Variations in the compositions may be made for enhancement of flowering and pigmentation by adjusting the N-P-K ratios, for instance, reduction of N and enhancement of P by adding phosphate salts such as $KH_2PO_4$ and/or $K_2HPO_4$ will intensify flowering.

The amount of fertilizer added to the formulations of the present invention will depend upon the plants to be treated, and the nutrient content of the soil. Generally, fertilizers may be present in amounts sufficient to balance growth attained with alkyl glycoside when applied to the plant. Typically, the conventional fertilizer is included in the amount of between about 10 ppm and about 1000 ppm, preferably between about 50 ppm and about 900 ppm, and more preferably between about 60 ppm and about 600 ppm by weight of the composition. High potency is achieved by shoot or root application of formulations which provide the alkyl glycoside in combination with conventional plant nutrients or readily metabolized precursors, thereto.

In addition to high concentrations of manganese, the formulations of the present invention may also include any of various secondary nutrients, such as sources of sulfur, calcium, and magnesium; as well as micronutrients, such as chelated iron, boron, cobalt, copper, molybdenum, zinc, nickel, and the like, which are conventionally formulated into fertilizers. Other conventional fertilizer constituents which may be added to the compositions of the present invention include pesticides, fungicides, antibiotics, plant growth regulators, gene therapies and the like. Formulations including N-P-K and iron supplementation are particularly preferred.

Among the plant growth regulators which may be added to the formulations of the present invention are auxins; brassinolides; cytokinins; gibberellins; amino acids; benzoates; vitamins; herbicides, such as, phosphonomethylglycine and sulfonylurea; salts, esters, phosphates, hydrates and derivatives thereof; and the new cytochrome P450 plant growth regulating compositions.

The following examples are provided to illustrate the methods of the invention and should not be construed as limiting. In these examples, purified water was obtained from Hampshire Chemical Corporation; GEO-MEG®, a methyl glucoside liquid blend was obtained from Horizon Products; Versene® Ag 6% Mn was obtained from Dow Chemical Corporation; and Pluronic L-92, an aqueous surfactant, was obtained from BASF.

Abbreviations used in the following examples are defined as follows: "MeG" means methyl glucoside; "L" means liter; "ml" means milliliter; "mg" means milligram; "g" means gram; "kg" means kilogram; and "mM" means millimolar.

The following are examples of specific formulations according to the present invention which may advantageously be employed in the methods of the invention to treat plants and to enhance growth in plants. The following examples are intended to provide guidance to those skilled in the art and do not represent an exhaustive list of formulations within the scope of the invention.

In general, the methods of the invention comprise the steps of, formulating highly concentrated manganese with an alkyl glycoside and applying the resulting mixture in a dry or liquid form directly to the plants and/or the plant soil. The concentration of manganese in the formulations should generally be between about 2–100 ppm and more preferably between about 2–50 ppm. For specific applications, the concentration of manganese should be between about 2–15 ppm for root application and 15–75 ppm for foliar application. When diluted in an aqueous carrier, the resulting diluted mixture, of chelated $Mn^{+2}$ and one or more straight chain alkyl glycosides, is preferably applied to foliage in an amount of about 30 gallons per acre of plants, wherein the concentration of manganese is between about 15 ppm to 50 ppm.

EXAMPLE 1

Dry Formulation

| Component | Grams |
| --- | --- |
| α-methyl glucoside | 500 g |
| FeHeEDTA | 2 g |
| MnEDTA (12% Mn) | 2 g |
| ammonium sulfate | 400 g |
| potassium phosphate | 100 g |

Dilute the entire amount of the dry mixture of α-methyl glucoside and salts in 100 L of water. Mix until dissolved. Apply to 1 acre containing approximately 20,000 plants (e.g. corn). Calculation application based on a minimum of 20 mg of dry mixture per plant. Alternatively, the dry mixture may be applied to the plant soil directly and then watered in to the roots with irrigation. The Mn concentration of the dry formulation is about 500 ppm which, when applied to the soil directly, is about 1000 × the normally distributed concentration of conventional agricultural field treatments.

EXAMPLE 2

Liquid Formulation

| Component | Amount |
|---|---|
| α-methyl glucoside | 1.94 g |
| chelated $Mn^{+2}$ | 1 ppm |
| water | 1 L |

Add the 1.94 g of α-methyl glucoside to 1 liter of water containing about 1 ppm $Mn^{+2}$ solubilized in one or more complexing agents such as HeEDTA, DTPA, EDTA, EDDHA, citrate or other such chelant. Then apply a volume of the liquid formulation sufficient to drench the roots, between about 10 ml to 100 ml per plant. The diluted aqueous liquid formulation is about 50 × the normally distributed concentration of conventional agricultural field treatments.

EXAMPLE 3

Liquid Formulation

| Component | Amount |
|---|---|
| GEO-MEG ® 365 (65% methyl glucoside) | 1.5 kg |
| Versene ® Ag (6% Mn as EDTA) | 8.0 g |
| water | 200 L |

Dilute the mixture of GEO-MEG® 365 and Versene® Ag in about 200 L of water and apply to 1 hectare of plants. Similarly, the diluted aqueous liquid formulation is about 50 × the normally distributed concentration of conventional agricultural field treatments.

EXAMPLE 4

Liquid Formulation

| Component | Amount |
|---|---|
| α-methyl glucoside | 50 g/L |
| MnEDTA (12% Mn) | 0.2 g/L |
| Pluronic L-92 | 2 g/L |
| Water | 1 L |
| ammonium sulfate | 6.6 g/L |
| FeEDTA | 0.2 g/L |

Dilute the mixture in about 1 liter of water. Mix until the mixture is dissolved in the water. Spray the resulting formulation on the plant foliage (e.g. New Guinea Impatiens leaves) at an application volume of between about 20–30 gallons per acre.

The following results show growth promotion using the formulations of the invention versus conventionally cultured controls and Mn-chelant or alkyl glycoside controls.

| | Additive | | |
|---|---|---|---|
| Plant type | MeG + Mn | Mn | MeG |
| Geranium | enhanced growth | phytotoxic | retarded growth |
| Coleus | enhanced growth | phytotoxic | retarded growth |
| New Guinea Impatiens | enhanced growth | phytotoxic | retarded growth |

The following are exemplary ranges of effective root application doses based on 10 ml per plant.

| Plant type | MeG (mM) | Mn (ppm) |
|---|---|---|
| Geranium | 10 to 100 | 2 to 15 |
| Coleus | 5 to 50 | 2 to 7 |
| Cabbage | 10 to 30 | 2 to 15 |

The following are exemplary ranges of effective foliar application doses based on 1 to 4 ml per plant.

| Plant type | MeG (mM) | Mn (ppm) |
|---|---|---|
| New Guinea Impatiens | 200 to 500 | 10 to 25 |
| Corn | 5 to 25 | 10 to 25 |

Although specific features of the invention are described with respect to one example and not others, this is for convenience only as some feature of one described example may be combined with one or more of the other examples in accordance with the methods and formulations of the invention.

Other permutations of the methods and formulations of the invention will occur to those skilled in the art and are within the following claims:

1. A method for rendering high concentrations of manganese safe for plant growth, comprising the steps of, mixing one or more alkyl glycoside's with manganese resulting in a mixture comprising manganese at a concentration of between about 20 to 75 ppm, and applying a suitable amount of the resulting mixture to one or more plants.

2. The method of claim 1, said plants comprise foliage; further comprising iron at a concentration approximately equal to said concentration of said manganese; and wherein said resulting mixture is applied to said foliage.

3. The method of claim 1, wherein said plants comprise roots and said resulting mixture is applied to said roots.

4. The method of claim 1, wherein said alkyl glycoside comprises one or more methyl glucosides.

5. The method of claim 1, wherein manganese is mixed with said methyl glucoside as one or more chelated manganese compounds comprising one or more complexing agents selected from a group consisting of HeEDTA, DTPA, EDTA, EDDHA, citrate, ascorbate and a manganese chelant.

6. The method of claim 1, wherein said methyl glucoside is added to an aqueous solution comprising $Mn^{+2}$.

7. The method of claim 1, wherein said alkyl glycoside comprises α-methyl glucoside and said manganese comprises MnEDTA.

8. The method of claim 7, wherein said plants are cultivated in soil, wherein said resulting mixture is applied to said soil as a dry powder and wherein said method further comprises the step of irrigating said soil.

9. The method of claim 7, further comprising the step of diluting said resulting mixture in one or more aqueous carriers and applying the diluted resulting mixture to said plants.

10. The method of claim 1, wherein said manganese is mixed with said alkyl glycoside as one or more chelated manganese compounds comprising one or more complexing agents selected from a group consisting of HeEDTA, DTPA, EDTA, EDDHA, citrate, ascorbate and a manganese chelant.

11. The method of claim 1, wherein said alkyl glycoside comprises a blend of α-methyl glucoside and β-methyl glucoside.

12. The method of claim 11, wherein said blend of a-methyl glucoside and β-methyl glucoside is a liquid syrup mixed with said manganese solubilized by EDTA.

13. The method of claim 12, further comprising the step of diluting said resulting mixture in one or more aqueous carriers.

14. The method of claim 1, wherein said alkyl glycoside comprises methyl glucoside mixed with said manganese solubilized by EDTA, further comprising the step of adding one or more aqueous surfactants to said mixture.

15. The method of claim 14, wherein said plants have foliage, further comprising the step of diluting said resulting mixture in water and applying said resulting diluted mixture to said foliage of said plants.

16. The method of claim 1, wherein said plants comprise roots; further comprising iron at a concentration approximately equal to said concentration of said manganese; and wherein said resulting mixture is applied to said roots.

17. A method for rendering high concentrations of manganese safe for plant growth, comprising the steps of, mixing one or more methyl glucosides with chelated manganese resulting in a mixture comprising manganese at a concentration of between about 20 to 75 ppm, wherein said chelated manganese, comprising one or more complexing agents selected from a group consisting of HeEDTA, DTPA, EDTA, EDDHA, citrate, ascorbate and a manganese chelant, is mixed with methyl glucoside; and applying a suitable amount of the resulting mixture to one or more plants.

18. The method of claim 17, wherein said methyl glucoside comprises a blend of α-methyl glucoside and β-methyl glucoside and wherein said complexing agent comprises EDTA.

19. The method of claim 17, further comprising the step of diluting said resulting mixture in an aqueous carrier.

20. The method of claim 19, wherein said resulting mixture diluted in said aqueous carrier is applied in an amount of about 30 gallons per acre of plants.

21. A method for rendering high concentrations of manganese safe for plant growth, comprising the steps of, mixing one or more alkyl glycosides with at least manganese, iron and an ammonia nutrient, resulting in a mixture comprising manganese at a concentration of between about 20 to 75 ppm; and applying a suitable amount of the resulting mixture comprising iron at a concentration approximately equal to the concentration of manganese.

22. The method of claim 21, wherein said resulting mixture comprises iron at a concentration approximately equal to the concentration of manganese.

23. The method of claim 22, wherein said ammonia nutrient is ammoniacal nitrogen.

24. The method of claim 21, wherein said manganese is $Mn^{+2}$ solubilized with a complexing agent.

25. A formulation for treating plants and enhancing plant growth, comprising, one or more alkyl glycosides; and manganese at a concentration of between about 20 to 75 ppm.

26. The formulation of claim 25, further comprising iron at a concentration approximately equal to said concentration of said manganese.

27. The formulation of claim 25, wherein said manganese comprises $Mn^{+2}$ and said alkyl glycoside comprises one or more methyl glucosides.

28. The formulation of claim 25, further comprising one or more complexing agents selected from a group consisting of. HeEDTA, DTPA, EDTA, EDDHA, citrate, ascorbate and a manganese chelant.

29. The formulation of claim 25, wherein the alkyl glycoside comprises a 50/50 blend of α-methyl glucoside and β-methyl glucoside.

30. The formulation of claim 25, further comprising one or more aqueous carriers.

31. The formulation of claim 25, further comprising one or more iron sources, one or more surfactants and one or more ammonia sources.

32. A formulation for treating plants and enhancing plant growth, comprising, one or more alkyl glycosides; manganese at a total concentration of between about 20 to 75 ppm; one or more iron sources at a concentration approximately equal to said total concentration of said manganese; one or more surfactants; and one or more ammonia sources.

* * * * *